US012700372B2

(12) United States Patent
Lee et al.

(10) Patent No.: US 12,700,372 B2

(45) Date of Patent: Aug. 4, 2026

(54) DISPLAY APPARATUS

(71) Applicant: Samsung Display Co., Ltd., Yongin-si (KR)

(72) Inventors: Kyunghoe Lee, Yongin-si (KR); Junhyun Park, Yongin-si (KR); Heerim Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/080,456

(22) Filed: Mar. 14, 2025

(65) Prior Publication Data

US 2025/0292739 A1 Sep. 18, 2025

(30) Foreign Application Priority Data

Mar. 18, 2024 (KR) ........................ 10-2024-0037392

(51) Int. Cl.

*G09G 3/3266* (2016.01)
*G09G 3/3233* (2016.01)

(52) U.S. Cl.

CPC ......... *G09G 3/3266* (2013.01); *G09G 3/3233* (2013.01); *G09G 2300/0426* (2013.01); *G09G 2300/0819* (2013.01); *G09G 2300/0852* (2013.01); *G09G 2310/0286* (2013.01)

(58) Field of Classification Search

CPC ............... G09G 3/3266; G09G 3/3233; G09G 2300/0426; G09G 2300/0819; G09G 2300/0852; G09G 2310/0286

See application file for complete search history.

(56) References Cited

U.S. PATENT DOCUMENTS

| | | | | |
|---|---|---|---|---|
| 10,451,942 | B2 * | 10/2019 | Yu | G02F 1/136286 |
| 11,276,353 | B2 | 3/2022 | Park et al. | |
| 11,943,981 | B2 * | 3/2024 | Wei | G09G 3/3233 |
| 12,356,810 | B2 * | 7/2025 | Du | G09G 3/3291 |
| 2017/0219895 | A1 * | 8/2017 | Yu | G09G 3/2092 |
| 2019/0259345 | A1 * | 8/2019 | Hosoyachi | G09G 3/3648 |
| 2022/0320228 | A1 * | 10/2022 | Du | H10K 59/131 |

(Continued)

FOREIGN PATENT DOCUMENTS

| | | |
|---|---|---|
| KR | 10-2022-0140928 A | 10/2022 |
| KR | 10-2023-0108762 A | 7/2023 |
| KR | 10-2023-0151151 A | 11/2023 |

*Primary Examiner* — Michael J Jansen, II

(74) *Attorney, Agent, or Firm* — Womble Bond Dickinson (US) LLP

(57) ABSTRACT

A display apparatus includes: a substrate comprising a display area including a rounded corner and a peripheral area outside the display area, wherein the display area comprises a first display area and a second display area; a plurality of first driving circuits in the first display area; a plurality of first light-emitting diodes electrically connected to the plurality of first driving circuits; a plurality of second driving circuits in the second display area; a plurality of second light-emitting diodes electrically connected to the plurality of second driving circuits; a plurality of gate lines electrically connected to the plurality of first driving circuits and the plurality of second driving circuits; and a plurality of stages in the second display area and electrically connected to the plurality of gate lines, wherein the plurality of stages have a stepwise configuration along the rounded corner of the display area in a plan view.

18 Claims, 7 Drawing Sheets

(56) References Cited

U.S. PATENT DOCUMENTS

| | | | |
|---|---|---|---|
| 2022/0328590 A1 | 10/2022 | Kim et al. | |
| 2023/0136237 A1* | 5/2023 | Wei | G09G 3/3266 345/204 |
| 2023/0225164 A1 | 7/2023 | Seo et al. | |
| 2023/0345764 A1 | 10/2023 | Lee et al. | |

* cited by examiner

DISPLAY APPARATUS

CROSS-REFERENCE TO RELATED APPLICATION

The present application claims priority to and the benefit of Korean Patent Application No. 10-2024-0037392, filed on Mar. 18, 2024, in the Korean Intellectual Property Office, the entire disclosure of which is incorporated herein by reference.

BACKGROUND

1. Field

Aspects of one or more embodiments relate to a display apparatus.

2. Description of the Related Art

Recently, display panels have been more diversified in use. In addition, as display panels have become relatively thinner and lighter, the range of uses of display panels has widened.

Research is conducted to reduce an area outside a display area, that is, the area of a dead area, while expanding an area occupied by the display area of a display panel.

The above information disclosed in this Background section is only for enhancement of understanding of the background and therefore the information discussed in this Background section does not necessarily constitute prior art.

SUMMARY

Aspects of one or more embodiments include a structure for a display apparatus having rounded corners.

Additional aspects will be set forth in part in the description which follows and, in part, will be apparent from the description, or may be learned by practice of the presented embodiments of the disclosure.

According to one or more embodiments, a display apparatus includes a substrate including a display area including a rounded corner and a peripheral area outside the display area, wherein the display area includes a first display area and a second display area between the first display area and the peripheral area, a plurality of first driving circuits in the first display area, a plurality of first light-emitting diodes electrically connected to the plurality of first driving circuits, respectively, a plurality of second driving circuits in the second display area, a plurality of second light-emitting diodes electrically connected to the plurality of second driving circuits, respectively, a plurality of gate lines electrically connected to the plurality of first driving circuits and the plurality of second driving circuits, and a plurality of stages in the second display area and electrically connected to the plurality of gate lines, wherein the plurality of stages is arranged in a stepwise configuration along the rounded corner of the display area in a plan view.

According to some embodiments, a voltage line configured to apply a voltage to the plurality of stages may overlap the plurality of second driving circuits in the second display area.

According to some embodiments, the voltage line may overlap the plurality of stages in the second display area.

According to some embodiments, the voltage line may be bent to have a stepwise shape in a plan view.

According to some embodiments, each of the plurality of first driving circuits and the plurality of second driving circuits may include a driving transistor, a first transistor, and a second transistor, the first transistor and the second transistor being electrically connected to the driving transistor, wherein the plurality of stages include a plurality of first stages to provide a gate signal to the first transistor of corresponding ones of the plurality of first and second driving circuits, and a plurality of second stages to provide a gate signal to the second transistor of corresponding ones of the plurality of first and second driving circuits.

According to some embodiments, in a plan view, one of two adjacent first stages among the plurality of first stages may be arranged in a first direction with another of the two adjacent first stages and shifted from the other of the two adjacent first stages in a second direction intersecting the first direction, and, in a plan view, one of two adjacent two second stages among the plurality of second stages may be arranged in the first direction with another of the two adjacent second stages and shifted from the other of the two adjacent second stages in the second direction.

According to some embodiments, a length of each of the plurality of first stages in the first direction may be different from a length of each of the plurality of second stages in the first direction.

According to some embodiments, the display apparatus may further include a plurality of clock signal lines in the peripheral area, wherein a signal connection line connecting one of the plurality of clock signal lines to a corresponding one of the plurality of second stages may be in the second display area and pass between the two adjacent first stages.

According to some embodiments, a carry signal line between two adjacent first stages among the plurality of first stages or between two adjacent second stages among the plurality of second stages may be bent in a plan view.

According to some embodiments, one of the plurality of stages may provide a gate signal to a corresponding one of the plurality of gate lines via an output signal line, and the output signal line and the corresponding one of the plurality of gate lines may be electrically connected to each other in the peripheral area.

According to one or more embodiments, a display apparatus includes a substrate including a display area including a rounded corner and a peripheral area outside the display area, wherein the display area includes a first display area and a second display area between the first display area and the peripheral area, a plurality of driving circuits in the first display area and the second display area, a plurality of light-emitting diodes on the plurality of driving circuits and electrically connected to the plurality of driving circuits, and a plurality of first stages interposed between the substrate and the plurality of driving circuits and configured to provide a first gate signal to the plurality of driving circuits, wherein the plurality of first stages are in the second display area and arranged in a stepwise configuration along the rounded corner of the display area in a plan view.

According to some embodiments, a voltage line configured to apply a voltage to the plurality of first stages may overlap the plurality of driving circuits in the second display area.

According to some embodiments, the voltage line may overlap the plurality of first stages in the second display area.

According to some embodiments, the voltage line may extend in a first direction and is bent in a plan view.

According to some embodiments, the display apparatus may further include a plurality of second stages in the second display area and configured to provide a second gate signal to the plurality of driving circuits, wherein the plurality of second stages may be arranged in a stepwise configuration in a plan view.

According to some embodiments, in a plan view, the plurality of second stages may be between the plurality of first stages and the first display area, and a length of each of the plurality of first stages in a first direction may be different from a length of each of the plurality of second stages in the first direction.

According to some embodiments, the length of each of the plurality of first stages in the first direction may be less than the length of each of the plurality of second stages in the first direction.

According to some embodiments, the display apparatus may further include a plurality of clock signal lines in the peripheral area, wherein a signal connection line connecting one of the plurality of clock signal lines to a corresponding one of the plurality of second stages may be in the second display area and may pass between two adjacent first stages among the plurality of first stages.

According to some embodiments, a carry signal line between two adjacent first stages among the plurality of first stages or between two adjacent second stages among the plurality of second stages may be bent in the plan view.

According to some embodiments, the display apparatus may further include a first gate line electrically connected to the plurality of driving circuits, and one of the plurality of first stages may provide a first gate signal to the first gate line via an output signal line, and the output signal line and the first gate line may be electrically connected to each other in the peripheral area.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
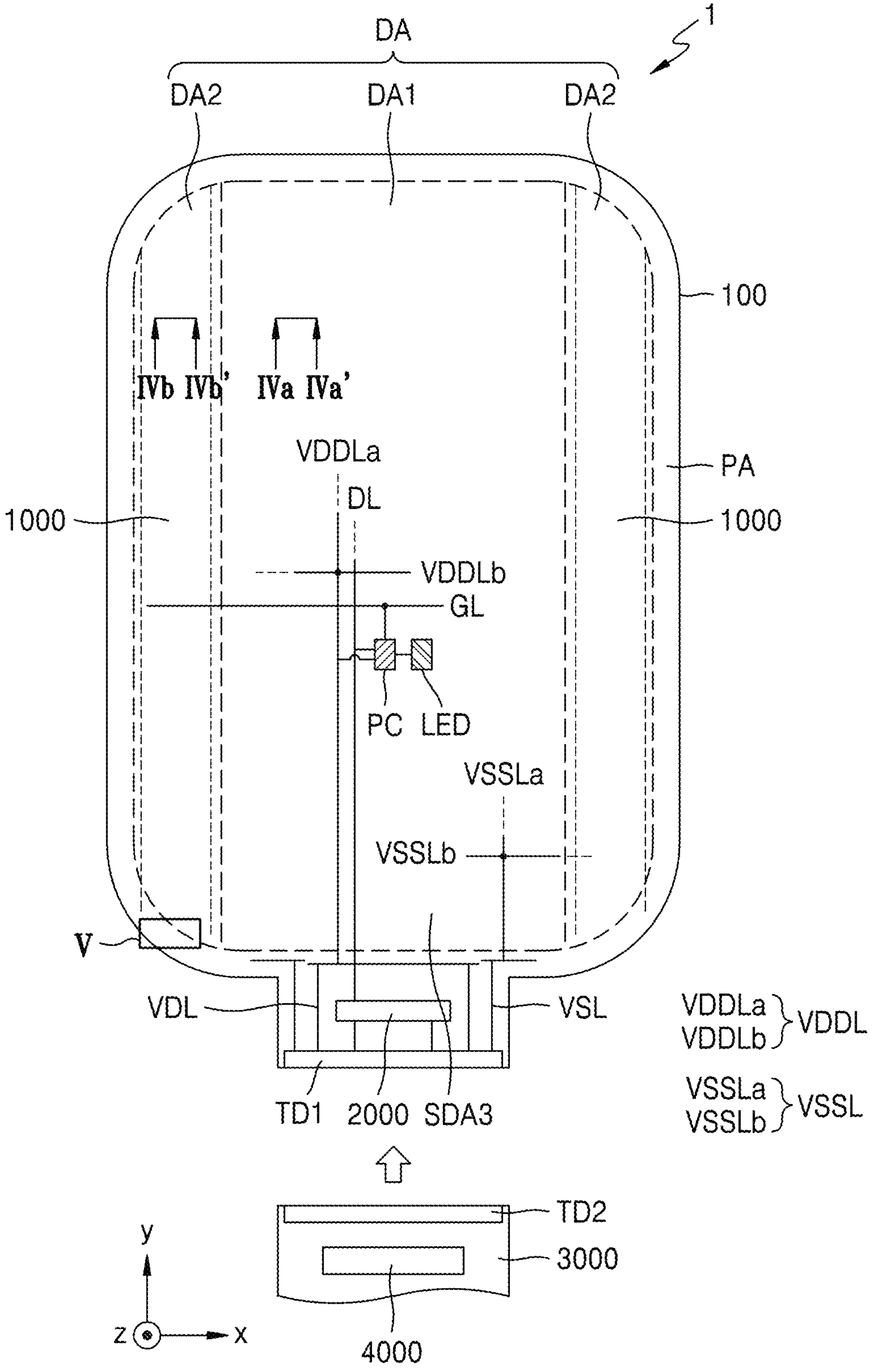
FIG. 1 is a schematic plan view of a display apparatus according to some embodiments.

Reference will now be made in more detail to aspects of some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Effects and features of the disclosure and methods of achieving the same will be apparent with reference to embodiments and drawings described below in detail. The disclosure may, however, be embodied in many different forms and should not be construed as being limited to the embodiments set forth herein.

The disclosure will now be described more fully with reference to the accompanying drawings, in which embodiments of the disclosure are shown. Like reference numerals in the drawings denote like elements, and thus their description will not be repeated.

In the following embodiments, while such terms as "first," "second," etc., may be used to describe various elements, such elements must not be limited to the above terms.

In the following embodiments, an expression used in the singular encompasses the expression of the plural, unless it has a clearly different meaning in the context.

In the following embodiments, it is to be understood that the terms such as "including" and "having" are intended to indicate the existence of the features, or elements disclosed in the disclosure, and are not intended to preclude the possibility that one or more other features or elements may exist or may be added.

It will be understood that when a layer, region, or element is referred to as being formed on another layer, region, or element, it can be directly or indirectly formed on the other layer, region, or element. That is, for example, intervening layers, regions, or elements may be present.

Sizes of elements in the drawings may be exaggerated for convenience of explanation. In other words, because sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is referred to as being connected to another layer, region, or component, it can be directly or indirectly connected to the other layer, region, or component. That is, for example, intervening layers, regions, or components may be present. For example, it will be understood that when a layer, region, or component is referred to as being electrically connected to another layer, region, or component, it can be directly or indirectly electrically connected to the other layer, region, or component. That is, for example, intervening layers, regions, or components may be present.

The x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

FIG. 1 is a schematic plan view of a display apparatus according to some embodiments.

Referring to FIG. 1, a display apparatus 1 may include a display area DA and a peripheral area PA. The shape of the display apparatus 1 of FIG. 1 may substantially the same as the shape of a substrate 100. For example, the display apparatus 1 including the display area DA and the peripheral area PA may indicate that the substrate 100 includes the display area DA and the peripheral area PA. The display area DA may include rounded corners, and the substrate 100 may also have rounded corners on the whole along the rounded corners of the display area DA.

The display area DA may display images by using light emitted from respective light-emitting diodes LED. The peripheral area PA is a non-display area arranged outside (e.g., in a periphery or outside a footprint of) the display area DA and does not display images. The peripheral area PA may entirely surround the display area DA.

A light-emitting diode LED may be an organic light-emitting diode including an organic emission layer. Alternatively, the light-emitting diode LED may be an inorganic light-emitting diode including an inorganic emission layer. The size of the light-emitting diode LED may be in a micro-scale or a nano-scale. For example, the light-emitting diode LED may be a micro light-emitting diode. Alternatively, the light-emitting diode LED may be a nanorod light-emitting diode. The nanorod light-emitting diode may include gallium nitride (GaN). According to some embodiments, a color converting layer may be above the nanorod light-emitting diode. The color converting layer may include quantum dots. Alternatively, the light-emitting diode LED may be a quantum dot light-emitting diode including a quantum dot emission layer.

A driving circuit PC (also referred to as a pixel circuit PC) electrically connected to each light-emitting diode LED may be a circuit that controls the operation of the light-emitting diode LED. A plurality of driving circuits PC may be two-dimensionally arranged in the display area DA. Each driving circuit PC may include transistors and at least one storage capacitor. According to some embodiments, each driving circuit PC may be connected to a data line DL and a gate line GL. The data line DL may extend in a first direction (e.g., a y direction), and the gate line GL may extend in a second direction (e.g., an x direction) crossing the first direction (e.g., the y direction). Although FIG. 1 illustrates a single driving circuit PC and a single light-emitting diode LED, as a person having ordinary skill in the art would recognize, the number of driving circuits PC and light-emitting diode LEDs may vary according to the design and size of the display apparatus 1. A third direction (e.g., a z direction) may be substantially perpendicular to a plane defined by the second direction (e.g., the x direction) and the first direction (e.g., the y direction).

A driving voltage supply line VDL, a common voltage supply line VSL, and a first terminal unit TD1 may be arranged in the peripheral area PA. The driving voltage supply line VDL and the common voltage supply line VSL may be arranged between the display area DA and the first terminal unit TD1.

The driving voltage supply line VDL may be electrically connected to a driving voltage line VDDL arranged in the display area DA. The driving voltage line VDDL may include a vertical driving voltage line VDDLa extending in the first direction (e.g., the y direction) and a horizontal driving voltage line VDDLb extending in the second direction (e.g., the x direction). The horizontal driving voltage line VDDLb and the vertical driving voltage line VDDLa may be connected to each other in the display area DA, and the vertical driving voltage line VDDLa may be electrically connected to the driving voltage supply line VDL positioned in the peripheral area PA.

The common voltage supply line VSL may be electrically connected to a common voltage line VSSL arranged in the display area DA. The common voltage line VSSL may include a vertical common voltage line VSSLa extending in the first direction (e.g., the y direction) and a horizontal common voltage line VSSLb extending in the second direction (e.g., the x direction). The horizontal common voltage line VSSLb and the vertical common voltage line VSSLa may be connected to each other in the display area DA, and the vertical common voltage line VSSLa may be electrically connected to the common voltage supply line VSL positioned in the peripheral area PA.

The first terminal unit TD1 may be positioned on one side of the substrate 100. A printed circuit board 3000 may be attached to the first terminal unit TD1 and electrically connected to the first terminal unit TD1. The printed circuit board 3000 may include a second terminal unit TD2 electrically connected to the first terminal unit TD1, and a controller 4000 may be located on the printed circuit board 3000. Control signals of the controller 4000 may be provided to a gate driver circuit 1000 arranged in the display area DA, a data driver circuit 2000 arranged in the peripheral area PA, the driving voltage supply line VDL, and the common voltage supply line VSL, through the first terminal unit TD1 and the second terminal unit TD2, respectively.

Unlike the data driver circuit 2000, the gate driver circuit 1000 may be arranged in the display area DA, and accordingly, the area of the peripheral area PA may be relatively reduced. The gate driver circuit 1000 may be arranged on each of opposite sides of the display area DA. For example, the display area DA may include a first display area DA1 and second display areas DA2 respectively arranged on opposite sides of the first display area DA1, and the gate driver circuit 1000 may be arranged in each second display area DA2. The second display area DA2 may have a relatively small area compared to the first display area DA1 and may include rounded corners.

Figure 2:
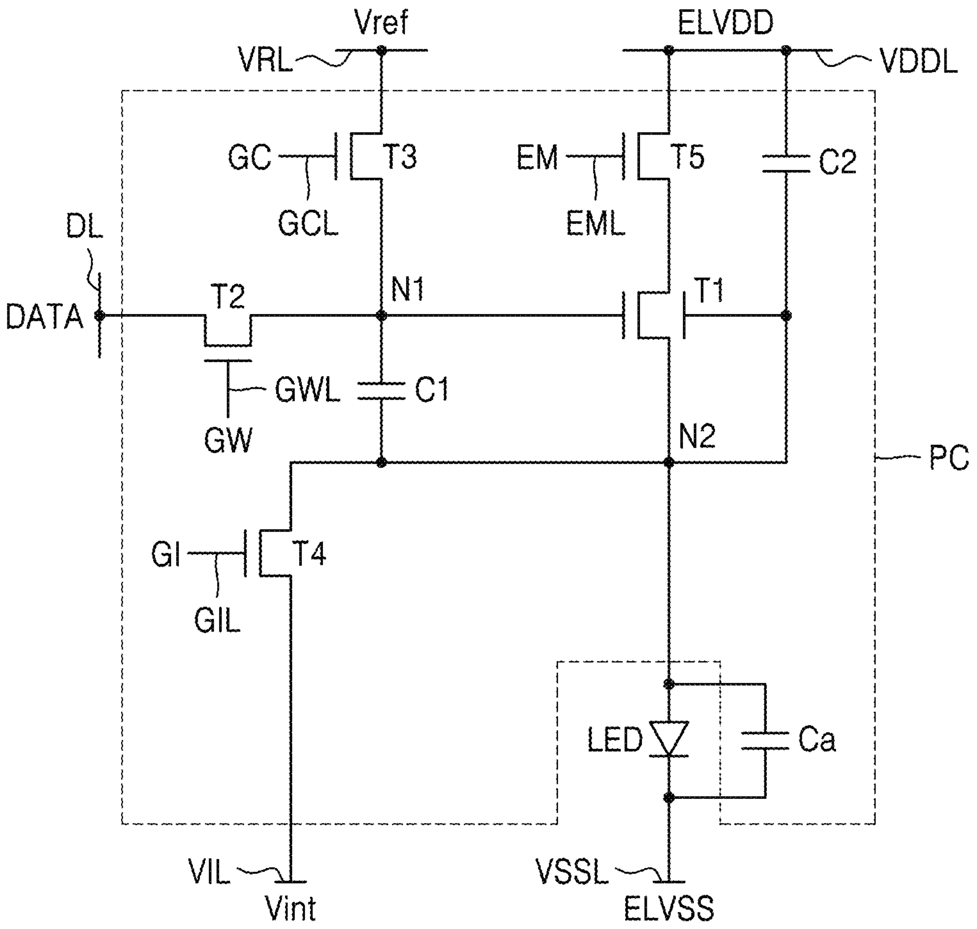
FIG. 2 is an equivalent circuit diagram schematically illustrating a driving circuit and a light-emitting diode, which are arranged in a display area of a display apparatus according to some embodiments.

FIG. 2 is an equivalent circuit diagram schematically illustrating the driving circuit PC and the light-emitting diode LED, which are arranged in the display area DA (refer to FIG. 1) of a display apparatus 1 (refer to FIG. 1) according to some embodiments. Although FIG. 2 illustrates various components in a driving circuit PC according to some embodiments, the components and structure of the driving circuit PC may vary according to various embodiments. For example, according to some embodiments, the driving circuit PC may include additional components or fewer components without departing from the spirit and scope of embodiments according to the present disclosure.

The driving circuit PC may be electrically connected to a first gate line GWL transmitting a first gate signal GW, a second gate line GIL transmitting a second gate signal GI, a third gate line GCL transmitting a third gate signal GC, a fourth gate line EML transmitting a fourth gate signal EM, the data line DL transmitting a data signal DATA. Because emission of the light-emitting diode LED is controlled by the fourth gate signal EM, the fourth gate signal EM may be referred to as an emission control signal, and the fourth gate line EML may be referred to as an emission control line. The driving circuit PC may be electrically connected to the driving voltage line VDDL transmitting a driving voltage ELVDD, a reference voltage line VRL transmitting a reference voltage Vref, and an initialization voltage line VIL transmitting an initialization voltage Vint.

According to some embodiments, a plurality of transistors included in the driving circuit PC may be oxide thin-film transistors. An oxide thin-film transistor may be a low-temperature polycrystalline oxide (LTPO) thin-film transistor in which a semiconductor layer includes an oxide. However, this is an example, and transistors of the disclosure are not limited thereto. For example, a semiconductor layer included in an N-type transistor may include an inorganic material semiconductor (e.g., amorphous silicon, polysilicon) or an organic material semiconductor, or the like.

In some embodiments, the driving circuit PC may include first to fifth transistors T1, T2, T3, T4, and T5, first to second capacitors C1 and C2, and an auxiliary capacitor Ca. The first transistor T1 may be a driving transistor that outputs a driving current corresponding to the data signal DATA, and the second to fifth transistors T2, T3, T4, and T5 may be switching transistors transmitting signals. A first terminal (or a first electrode) and a second terminal (or a second electrode) of each of the first to fifth transistors T1, T2, T3, T4, and T5 may be a source (or a source electrode) or a drain (or a drain electrode) according to the voltages of the first terminal and the second terminal, respectively. For example, according to the voltages of the first terminal and the second terminal, the first terminal may be a drain and the second terminal may be a source, or the first terminal may be a source and the second terminal may be a drain. Hereinafter, a node connected to a first-first gate of the first transistor T1 may be defined as a first node N1, and a node connected to the second terminal of the first transistor T1 may be defined as a second node N2.

The first transistor T1 may be connected to the driving voltage line VDDL and the light-emitting diode LED. The first transistor T1 may be connected between the fifth transistor T5 and the light-emitting diode LED. The first transistor T1 may include a gate (or a gate electrode), the first terminal, and the second terminal connected to the second node N2. The first transistor T1 may include the first-first gate connected to the first node N1. The first transistor T1 may further include a first-second gate connected to the second terminal thereof. The first-first gate and the first-second gate may be located on different layers to face each other. For example, the first-first gate and the first-second gate of the first transistor T1 may face each other with a semiconductor layer therebetween. Hereinafter, when referring to the gate (or the gate electrode) of the first transistor T1, it may mean the first-first gate involved in turning on and off the first transistor T1.

The gate of the first transistor T1 may be connected to a second terminal of the second transistor T2, a first terminal of the third transistor T3, and the first capacitor C1. The first-second gate of the first transistor T1 may be connected to the light-emitting diode LED, the first capacitor C1, and the second capacitor C2. The first terminal of the first transistor T1 may be connected to the driving voltage line VDDL via the fifth transistor T5, and the second terminal thereof may be connected to a pixel electrode of the light-emitting diode LED. According to some embodiments, other transistors may be further arranged between the first transistor T1 and the pixel electrode of the light-emitting diode LED.

The first terminal of the first transistor T1 may be connected to a second terminal of the fifth transistor T5. The second terminal of the first transistor T1 may be connected to the light-emitting diode LED, the first capacitor C1, and the second capacitor C2. The first transistor T1 may receive the data signal DATA according to a switching operation of the second transistor T2 and control a current amount of a driving current flowing to the light-emitting diode LED.

The second transistor T2 may be connected to the data line DL and the gate of the first transistor T1. The second transistor T2 may include a gate connected to the first gate line GWL, a first terminal connected to the data line DL, and a second terminal connected to the first node N1. The second terminal of the second transistor T2 may be connected to the gate of the first transistor T1, the first terminal of the third transistor T3, and the first capacitor C1. The second transistor T2 may be turned on by the first gate signal GW transmitted through the first gate line GWL to electrically connect the data line DL to the first node N1, and the data signal DATA transmitted through the data line DL may be transmitted to the first node N1.

The third transistor T3 may be connected to the gate of the first transistor T1 and the reference voltage line VRL. The third transistor T3 may include a gate connected to the third gate line GCL, a first terminal connected to the first node N1, and a second terminal connected to the reference voltage line VRL. The first terminal of the third transistor T3 may be connected to the gate of the first transistor T1, the second terminal of the second transistor T2, and the first capacitor C1. The third transistor T3 may be turned on by the third gate signal GC transmitted through the third gate line GCL to be configured to transmit the reference voltage Vref transmitted through the reference voltage line VRL to the first node N1. FIG. 2 illustrates that the second terminal of the third transistor T3 is connected to the reference voltage line VRL, but according to some embodiments, the second terminal of the third transistor T3 may be electrically connected to a gate, a first terminal, or a second terminal of one of transistors of the driving circuit PC.

The fourth transistor T4 may be connected between the first transistor T1 and the initialization voltage line VIL. The fourth transistor T4 may include a gate connected to the second gate line GIL, a first terminal connected to the second node N2, and a second terminal connected to the initialization voltage line VIL. The fourth transistor T4 may be turned on by the second gate signal GI transmitted through the second gate line GIL to be configured to transmit the initialization voltage Vint transmitted through the initialization voltage line VIL to the second node N2.

The fifth transistor T5 may be connected to the driving voltage line VDDL and the first transistor T1. The fifth transistor T5 may include a gate connected to the fourth gate line EML, a first terminal connected to the driving voltage line VDDL, and a second terminal connected to the first terminal of the first transistor T1. The fifth transistor T5 may be turned on or off according to the fourth gate signal EM transmitted through the fourth gate line EML.

The first capacitor C1 may be connected between the gate of the first transistor T1 and the second terminal of the first transistor T1. A first electrode of the first capacitor C1 may be connected to the first node N1, and a second electrode thereof may be connected to the second node N2. The first electrode of the first capacitor C1 may be connected to the gate of the first transistor T1, the second terminal of the second transistor T2, and the first terminal of the third transistor T3. The second electrode of the first capacitor C1 may be connected to the second terminal and the first-second gate of the first transistor T1, the second electrode of the second capacitor C2, and a first terminal of the sixth transistor T6. The first capacitor C1 is a storage capacitor, which may store a threshold voltage of the first transistor T1 and a voltage corresponding to the data signal DATA.

When the third transistor T3 and the fifth transistor T5 are turned on, the first transistor T1 may be turned on. When the voltage of the second terminal of the first transistor T1 drops to the difference (Vref−Vth1) between the reference voltage Vref and a threshold voltage (Vth1) of the first transistor T1, the first transistor T1 may be turned off, and a voltage corresponding to the threshold voltage (Vth1) of the first transistor T1 may be stored in the first capacitor C1, so that the threshold voltage (Vth1) of the first transistor T1 may be compensated.

The second capacitor C2 may be connected between the driving voltage line VDDL and the second node N2. A first electrode of the second capacitor C2 may be connected to the driving voltage line VDDL. A second electrode of the second capacitor C2 may be connected to the second terminal and the first-second gate of the first transistor T1, the second electrode of the first capacitor C1, and the first terminal of the sixth transistor T6.

The capacitance of each of the first capacitor C1 and the second capacitor C2 may vary depending on the color of light emitted by the light-emitting diode LED.

The auxiliary capacitor Ca may be electrically connected to the common voltage line VSSL and the pixel electrode of the light-emitting diode LED. The auxiliary capacitor Ca may store and maintain a voltage corresponding to the voltage difference between the pixel electrode of the light-emitting diode LED and the common voltage line VSSL.

The light-emitting diode LED may be electrically connected to the first transistor T1. The light-emitting diode LED may include the pixel electrode (anode) and an opposite electrode (cathode) facing the pixel electrode, and the opposite electrode may receive a common voltage ELVSS. According to some embodiments, the opposite electrode (cathode) may extend to the display area and may be electrically connected to the common voltage line VSSL that provides the common voltage ELVSS. A driving current output by the first transistor T1 may flow through the light-emitting diode LED by the fifth transistor T5 which is turned on, and the light-emitting diode LED may emit light with a brightness corresponding to the size of the driving current.

FIG. 2 illustrates that the driving circuit PC includes five transistors and three capacitors, but embodiments according to the present disclosure are not limited thereto. According to some embodiments, the driving circuit PC may include may include six or more or less than five transistors or may include one or two capacitors.

Figure 3:
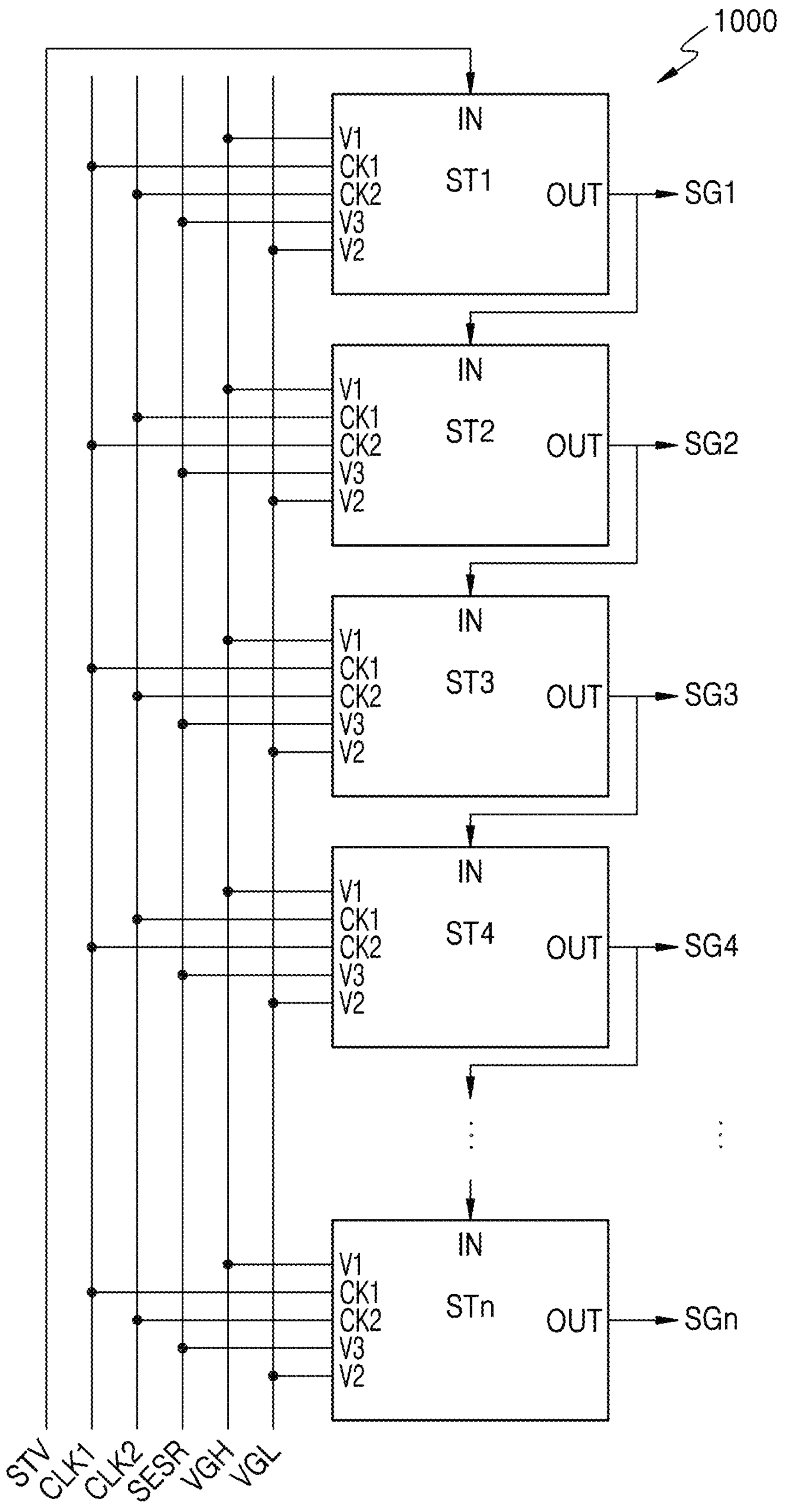
FIG. 3 is a circuit diagram schematically illustrating a gate driver circuit according to some embodiments.

FIG. 3 is a circuit diagram schematically illustrating a gate driver circuit 1000 according to some embodiments.

Referring to FIGS. 1 and 3, the gate driver circuit 1000 arranged in the display area DA (refer to FIG. 1) may include a plurality of stages. For example, the plurality of stages may include first to n-th stages ST1 to STn (where n is a natural number of 1 or more). In some embodiments, each of the first to n-th stages ST1 to STn may correspond to a row of driving circuits PC arranged in a second direction (e.g., an x direction) in the display area DA. Each of the first to n-th stages ST1 to STn may include at least one transistor and at least one capacitor.

Each of the first to n-th stages ST1 to STn may output signals in response to a start signal or a previous signal. A signal output by each of the first to n-th stages ST1 to STn may be a gate signal applied to the pixel circuit PC described with reference to FIG. 2. According to some embodiments, a signal output by each of the first to n-th stages ST1 to STn may be a scan signal, for example, one of the first to fourth gate signals GW, GI, GC, and EM, applied to the pixel circuit PC described with reference to FIG. 2.

Each of the first to n-th stages ST1 to STn may include an input terminal IN, a first clock terminal CK1, a second clock terminal CK2, a first voltage input terminal V1, a second voltage input terminal V2, a third voltage input terminal V3, and an output terminal OUT.

The input terminal IN may receive an external signal STV or a previous signal as a start signal. According to some embodiments, the external signal STV may be applied to the input terminal IN of the first stage ST1, a previous signal output by a previous stage may be applied to the input terminal IN of each of the second to n-th stage ST2 to STn other than the first stage ST1 as a carry signal. For example, the first stage ST1 may start driving by the external signal STV and generate and output a first signal SG1. The second stage ST2 may start driving by the carry signal, for example, the first signal SG1, and may generate and output a second signal SG2. The second signal SG2 output from the second stage ST2 may be input to the input terminal IN of a third stage ST3, and the third stage ST3 may generate and output a third signal SG3. The third signal SG3 output from the third stage ST3 may be input to the input terminal IN of a fourth stage ST4, and the fourth stage ST4 may generate and output a fourth signal SG4. An n−1-th signal output from an n−1-th stage may be input to the input terminal IN of the n-th stage STn, and the n-th stage STn may generate and output an n-th signal SGn.

A first clock signal CLK1 or a second clock signal CLK2 may be applied to the first clock terminal CK1 and the second clock terminal CK2, respectively. According to some embodiments, the first clock signal CLK1 and the second clock signal CLK2 may be alternately applied to the first to n-th stages ST1 to STn. For example, the first clock signal CLK1 may be applied to the first clock terminal CK1 of the odd-numbered stage, and the second clock signal CLK2 may be applied to the second clock terminal CK2 of the odd-numbered stage. The second clock signal CLK2 may be applied to the first clock terminal CK1 of the even-numbered stage, and the first clock signal CLK1 may be applied to the second clock terminal CK2 of the even-numbered stage.

The first voltage input terminal V1 may receive a first voltage VGH, which is a high voltage, and the second voltage input terminal V2 may receive a second voltage VGL, which is a low voltage. The first voltage VGH and the second voltage VGL may be rated voltages applied to the gate driver circuit 1000. The first voltage VGH and the second voltage VGL may be supplied from the controller 4000 as global signals. The third voltage input terminal V3 may receive a third voltage SESR. The third voltage SESR may be a voltage to solve the flashing problem of a display apparatus. In some embodiments, the third voltage SESR may be omitted.

The output terminal OUT may output a signal. According to some embodiments, the signal may be supplied to the pixel circuit PC through a scan line or a previous scan line as a scan signal or a previous scan signal. Alternatively, the signal may be supplied to the pixel circuit PC through an emission control line as an emission control signal. According to some embodiments, the signal may be supplied to the input terminal IN of the next stage as a carry signal.

Figure 4:
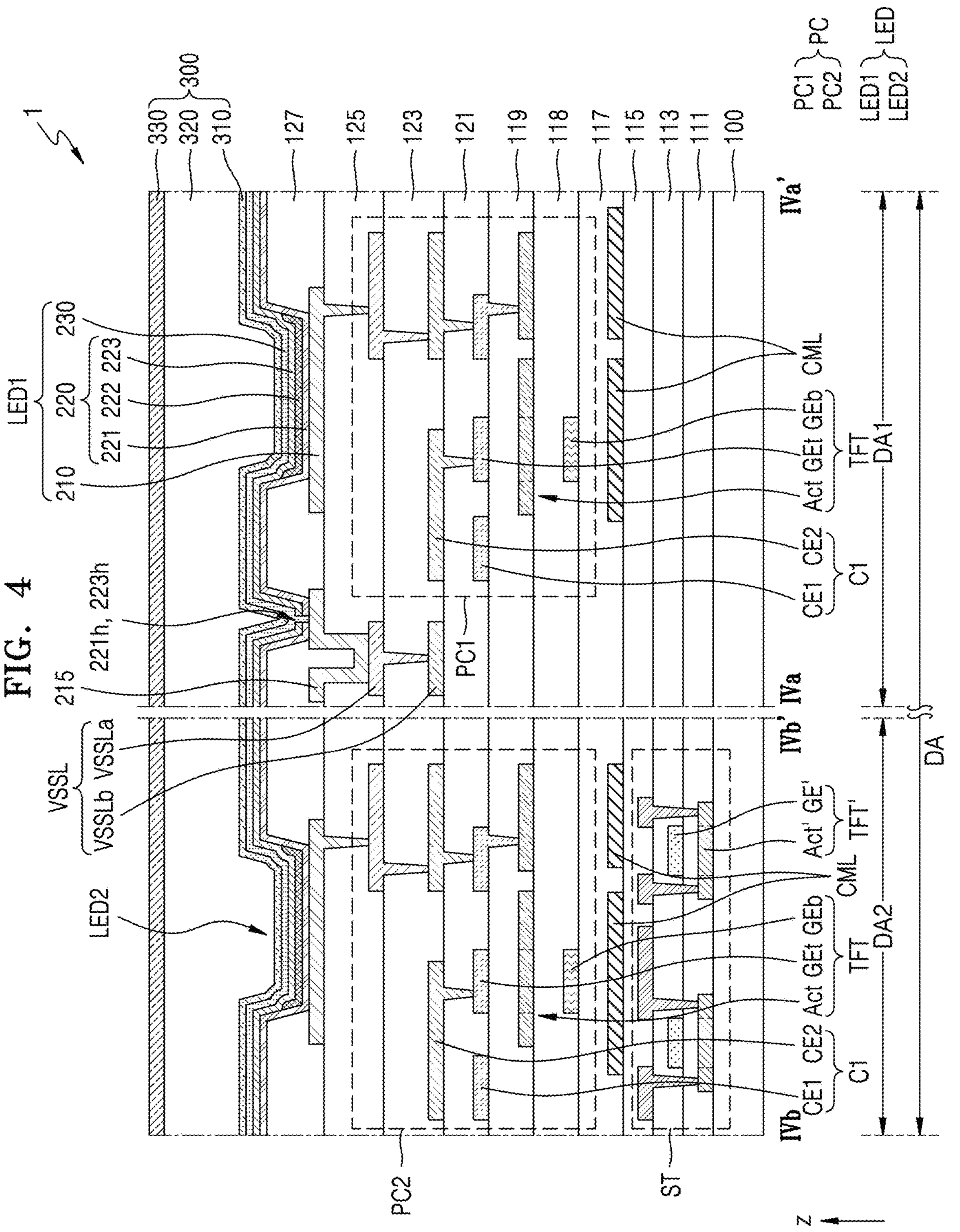
FIG. 4 shows schematic cross-sectional views of a display apparatus according to some embodiments, respectively taken along lines IVa-IVa' and IVb-IVb' of FIG. 1.

FIG. 4 shows schematic cross-sectional views of a display apparatus 1 according to some embodiments, respectively taken along the lines IVa-IVa' and IVb-IVb' of FIG. 1.

Referring to FIG. 4, the display apparatus 1 may include the substrate 100, a stage ST of a gate driver circuit located on the substrate 100, the driving circuit PC, and the light-emitting diode LED. The display area DA may include the first display area DA1 and the second display area DA2, as described above with reference to FIG. 1, and the driving circuit PC and the light-emitting diode LED may be arranged in the first display area DA1 and the second display area DA2. Hereinafter, the driving circuit PC arranged in the first display area DA1 is referred to as a first driving circuit PC1, the light-emitting diode LED arranged in the first display area DA1 is referred to as a first light-emitting diode LED1, the driving circuit PC arranged in the second display area DA2 is referred to as a second driving circuit PC2, and the light-emitting diode LED arranged in the second display area DA2 is referred to as a second light-emitting diode LED2.

A gate driver circuit, for example, the stages ST, may be arranged in the second display area DA2, and may overlap the second driving circuit PC2 and the second light-emitting diode LED2. For example, the stage ST may be arranged between the substrate 100 and the second driving circuit PC2, and the second driving circuit PC2 may be arranged between the stage ST and the second light-emitting diode LED2.

The substrate 100 may include a glass material or a polymer resin. According to some embodiments, the substrate 100 may have an alternating stacked structure of a base layer including a polymer resin and a barrier layer including an inorganic insulating material, such as silicon oxide or silicon nitride. The polymer resin may include a polymer material, such as polyethersulfone, polyarylate, polyetherimide, polyethylene naphthalate, polyethylene terephthalate, polyphenylene sulfide, polyimide, polycarbonate, cellulose triacetate, cellulose acetate propionate, or the like.

The stage ST may include a transistor TFT' located on the substrate 100. The transistor TFT' may include a semiconductor layer Act' and a gate electrode GE'. In this regard, FIG. 4 illustrates that the gate electrode GE' overlaps the semiconductor layer Act' with a first insulating layer 111 therebetween, and an electrode on a second insulating layer 113 is connected to a source area or a drain area of the semiconductor layer Act' through contact holes penetrating the first insulating layer 111 and the second insulating layer 113. The semiconductor layer Act' may include a silicon-based semiconductor material, for example, polysilicon. The gate electrode GE' may include a conductive material including molybdenum (Mo), aluminum (Al), copper (Cu), titanium (Ti), or the like, and may include a single-layered structure or a multi-layered structure, each including the material stated above. Each of the first insulating layer 111 and the second insulating layer 113 may include an inorganic insulating material, such as silicon nitride, silicon oxide, and silicon oxynitride. According to some embodiments, a buffer layer including an inorganic insulating material may be arranged between the substrate 100 and the transistor TFT' of the stage ST.

A third insulating layer 115 may be located on the transistors TFT' of the stage ST. The third insulating layer 115 may include an inorganic insulating material and/or an organic insulating material.

The first driving circuit PC1 and the second driving circuit PC2 may be located on a fourth insulating layer 117. To prevent or reduce signal interference between the stage ST and the second driving circuit PC2, which overlap each other in the second display area DA2, a conductive layer CML may be arranged between gate driver circuits, for example, between the stage ST and the second driving circuit PC2. The conductive layer CML may be located on the third insulating layer 115, and the fourth insulating layer 117 may be located on the conductive layer CML. The fourth insulating layer 117 may include an inorganic insulating material and/or an organic insulating material.

The conductive layer CML may include a conductive material including Mo, Al, Cu, Ti, or the like, and may include a single-layered structure or a multi-layered structure, each including the material described above. The conductive layer CML may overlap the semiconductor layer Act of each of the first driving circuit PC1 and the second driving circuit PC2, which will be described in more detail below. In some embodiments, the conductive layer CML may entirely overlap the semiconductor layer Act of each of the first driving circuit PC1 and the second driving circuit PC2 and may have a larger width than that of the semiconductor layer Act.

Each of the first driving circuit PC1 and the second driving circuit PC2 may include transistors and capacitors described above with reference to FIG. 2, and in this regard, FIG. 4 shows one transistor TFT and the first capacitor C1. In some embodiments, the transistor TFT shown in FIG. 4 may be one of the transistors shown in FIG. 2, for example, the first transistor T1.

The transistor TFT may include a semiconductor layer Act and a gate electrode GEt. The semiconductor layer Act of the transistor TFT of each of the first driving circuit PC1 and the second driving circuit PC2 may include a different material from that of the semiconductor layer Act' of the transistor TFT' of the stage ST. The semiconductor layer Act may include an oxide of at least one materials selected from a group consisting of indium (In), gallium (Ga), tin (Sn), zirconium (Zr), vanadium (V), hafnium (Hf), cadmium (Cd), germanium (Ge), chromium (Cr), titanium (Ti), aluminum (Al), cesium (Cs), cerium (Ce), and zinc (Zn). For example, the semiconductor layer Act may be an InSnZnO (ITZO) semiconductor layer, an InGaZnO (IGZO) semiconductor layer, or the like.

The gate electrode GEt may be located on the semiconductor layer Act with a sixth insulating layer 119 therebetween. When the first transistor T1 has two gates as described above with reference to FIG. 2, the gate electrode GEt shown in FIG. 4 may be the first-first gate described above with reference to FIG. 2, and a gate electrode Geb located below the semiconductor layer Act with a fifth insulating layer 118 therebetween may be the first-second gate described above with reference to FIG. 2.

The first capacitor C1 may include a first electrode CE1 and a second electrode CE2, which overlap each other with a seventh insulating layer 121 therebetween. In some embodiments, the first electrode CE1 may include the same material as the gate electrode GEt. Each of the first electrode CE1 and the second electrode CE2 may include a conductive material including Mo, Al, Cu, Ti, or the like, and may include a single-layered structure or a multi-layered structure, each including the material stated above. The seventh insulating layer 121 may include an inorganic insulating material.

An eighth insulating layer 123 may be located on the first capacitor C1, and a ninth insulating layer 125 may be located on the eighth insulating layer 123. Each of the eighth insulating layer 123 and the ninth insulating layer 125 may include an organic insulating material. The common voltage line VSSL may include the vertical common voltage line VSSLa and the horizontal common voltage line VSSLb, which are located on different layers with the eighth insulating layer 123 therebetween.

Each of the first light-emitting diode LED1 and the second light-emitting diode LED2 may include a pixel electrode 210, an opposite electrode 230, and an intermediate layer 220 between the pixel electrode 210 and the opposite electrode 230, wherein the pixel electrodes 210 of the first light-emitting diode LED1 and the second light-emitting diode LED2 are respectively electrically connected to the first driving circuit PC1 and the second driving circuit PC2.

The pixel electrode 210 may be located on the ninth insulating layer 125. The pixel electrode 210 may include a reflective film including silver (Ag), magnesium (Mg), aluminum (Al), platinum (Pt), palladium (Pd), gold (Au), nickel (Ni), neodymium (Nd), iridium (Ir), chromium (Cr), or a compound thereof. According to some embodiments, the pixel electrode 210 may further include a conductive oxide layer above and/or below the reflective film described above. The conductive oxide layer may include indium tin oxide (ITO), indium zinc oxide (IZO), zinc oxide (ZnO), indium oxide ($In_2O_3$), indium gallium oxide (IGO), and/or aluminum zinc oxide (AZO). According to some embodiments, the pixel electrode 210 may have a three-layered structure of an ITO layer/Ag layer/ITO layer.

A bank layer 127 may be located on the pixel electrode 210. The bank layer 127 may include an opening overlapping the pixel electrode 210 but may cover the edge of the pixel electrode 210. The bank layer 127 may include an organic insulating material. For example, the bank layer 127 may include an organic insulating material including a light-blocking material. In some embodiments, the bank layer 127 may include a polyimide (PI)-based binder, and a pigment in which red, green, and blue colors are mixed with each other. Alternatively, the bank layer 127 may include a cardo-based binder resin, and a mixture of a lactam black pigment and a blue pigment. The bank layer 127 may include an inorganic insulating material. For example, the bank layer 127 may include carbon black.

The intermediate layer 220 may include an emission layer 222. The emission layer 222 may include a high-molecular-weight organic material or a low-molecular-weight organic material, which emits light of a certain color. The emission layer 222 may include a material emitting red light, green light, or blue light.

The intermediate layer 220 may further include a functional layer below and/or above the emission layer 222. For example, a first functional layer 221 may be further included between the pixel electrode 210 and the emission layer 222, and a second functional layer 223 may be further included between the emission layer 222 and the opposite electrode 230 to be described in more detail below. The first functional layer 221 may include a hole transport layer and/or a hole injection layer. The second functional layer 223 may include an electron transport layer and/or an electron injection layer.

The opposite electrode 230 may include a conductive material having a low work function. For example, the opposite electrode 230 may include a (semi) transparent layer including Ag, Mg, Al, Pt, Pd, Au, Ni, Nd, Ir, Cr, Li, Ca, alloys thereof, or the like. Alternatively, the opposite electrode 230 may further include a layer, including such as ITO, IZO, ZnO, or $In_2O_3$, above the (semi) transparent layer including the materials stated above.

An encapsulation layer 300 may include at least one inorganic encapsulation layer and at least one organic encapsulation layer. According to some embodiments, FIG. 4 illustrates that the encapsulation layer 300 includes a first inorganic encapsulation layer 310, an organic encapsulation layer 320, and a second inorganic encapsulation layer 330.

Each of the first inorganic encapsulation layer 310 and the second inorganic encapsulation layer 330 may include one or more inorganic insulating materials from among aluminum oxide, titanium oxide, tantalum oxide, hafnium oxide, zinc oxide, silicon oxide, silicon nitride, and silicon oxynitride. The first inorganic encapsulation layer 310 and the second inorganic encapsulation layer 330 may each be a single layer or a multilayer, each including the material described above. The organic encapsulation layer 320 may include a polymer-based material. The polymer-based material may include an acrylic resin, an epoxy resin, PI, polyethylene, or the like. According to some embodiments, the organic encapsulation layer 320 may include acrylate.

The common voltage line VSSL may be located below the pixel electrode 210. The common voltage line VSSL may include the horizontal common voltage line VSSLb and the vertical common voltage line VSSLa, and one of the horizontal common voltage line VSSLb and the vertical common voltage line VSSLa, for example, the vertical common voltage line VSSLa, may overlap a connection electrode 215. The horizontal common voltage line VSSLb and the vertical common voltage line VSSLa may be connected to each other in the display area DA.

The connection electrode 215 may be located on the same layer as the pixel electrode 210, for example, on the ninth insulating layer 125. The connection electrode 215 may be connected to the common voltage line VSSL, for example, the vertical common voltage line VSSLa, through a hole penetrating the ninth insulating layer 125. FIG. 4 illustrates that a connection point of the connection electrode 215 and the vertical common voltage line VSSLa and a connection point of the horizontal common voltage line VSSLb and the vertical common voltage line VSSLa overlap each other, but embodiments according to the present disclosure are not limited thereto. In the display area DA, the connection point of the connection electrode 215 and the vertical common voltage line VSSLa and the connection point of the horizontal common voltage line VSSLb and the vertical common voltage line VSSLa may be arranged at different positions. The connection point of the connection electrode 215 and the vertical common voltage line VSSLa represents a contact hole in the ninth insulating layer 125 for electrical connection between the connection electrode 215 and the vertical common voltage line VSSLa, and the connection point of the horizontal common voltage line VSSLb and the vertical common voltage line VSSLa represents a contact hole in the eighth insulating layer 123 for electrical connection between the horizontal common voltage line VSSLb and the vertical common voltage line VSSLa.

FIG. 4 illustrates that the connection point of the connection electrode 215 and the vertical common voltage line VSSLa and the connection point of the horizontal common voltage line VSSLb and the vertical common voltage line VSSLa are arranged in the first display area DA1, but embodiments according to the present disclosure are not limited thereto. The connection point of the connection electrode 215 and the vertical common voltage line VSSLa and the connection point of the horizontal common voltage line VSSLb and the vertical common voltage line VSSLa may also be arranged in the second display area DA2.

FIG. 4 illustrates that the transistor TFT of the driving circuit PC corresponds to the first transistor T1 (refer to FIG. 2), which is a driving transistor described above with reference to FIG. 2, but embodiments according to the present disclosure are not limited thereto. A semiconductor layer of another transistor of the driving circuit PC may be located on the same layer as the semiconductor layer Act of the transistor TFT of FIG. 4 and may include the same material as the semiconductor layer Act of the transistor TFT of FIG. 4, and a gate electrode of another transistor of the driving circuit PC may be located on the same layer as the gate electrode GEt of the transistor TFT of FIG. 4 and may include the same material as the gate electrode GEt of the transistor TFT of FIG. 4.

Figure 5:
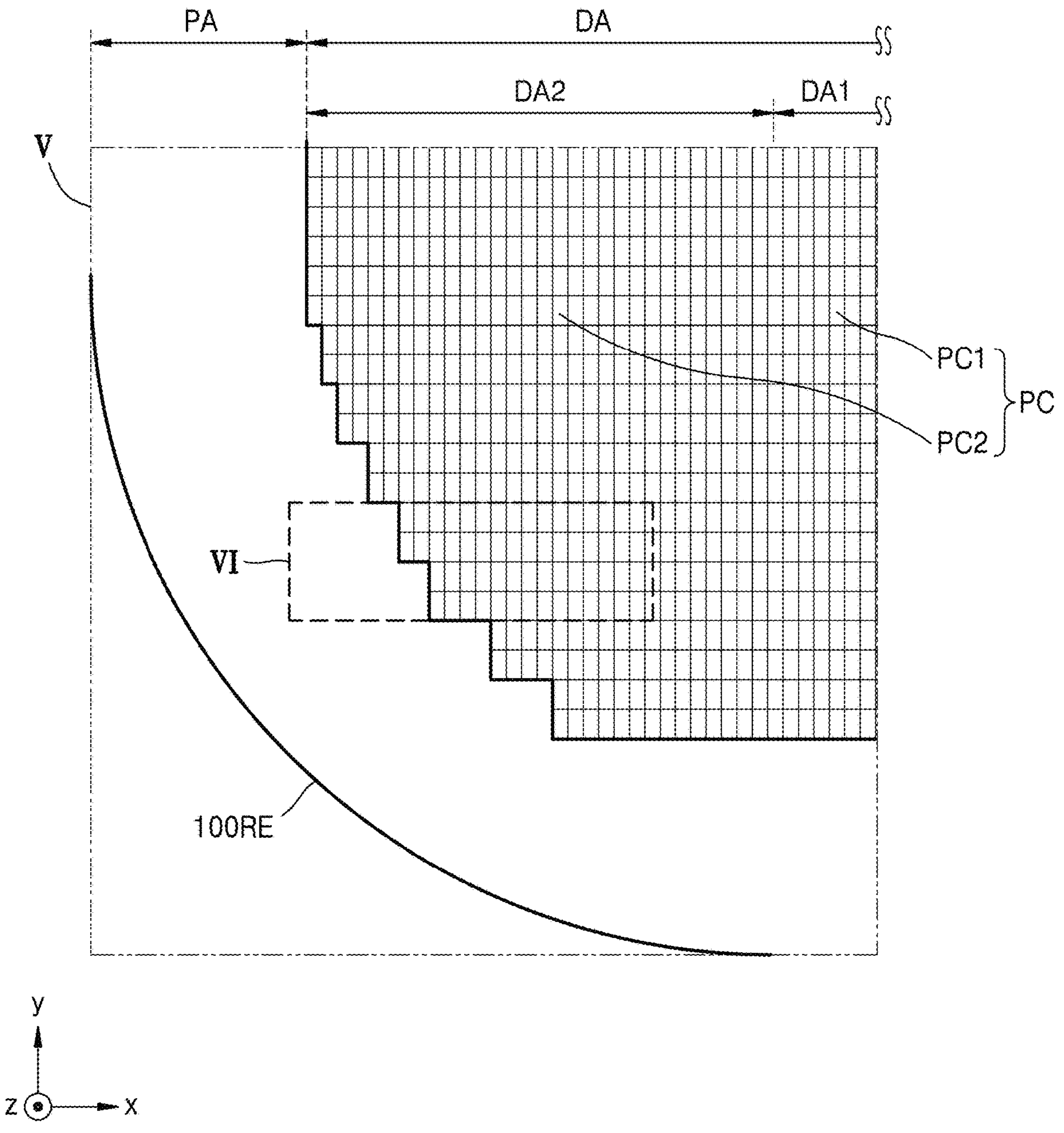
FIG. 5 is a schematic enlarged plan view of a region V of the display apparatus of FIG. 1, according to some embodiments.

FIG. 5 is a schematic enlarged plan view of a region V of the display apparatus 1 of FIG. 1, according to some embodiments.

Referring to FIG. 5, the display area DA may include rounded corner portions. The driving circuits PC arranged in the display area DA may be arranged in a matrix type in a first direction (e.g., an x direction) and a second direction (e.g., a y direction). In a plan view, the driving circuits PC may be arranged in a stepwise configuration along the rounded corner portion of the display area DA. For example, the second driving circuits PC2 arranged in the second display area DA2 may be arranged in a stepwise configuration along the rounded corner 100RE of the substrate 100. In a plan view, the second driving circuits PC2 may be arranged in the first direction (e.g., the y direction) and shifted from each other in the second direction (e.g., the x direction), and thus an arrangement of the second driving circuits PC2 may have a stepwise configuration.

FIG. 5 illustrates that the second driving circuits PC2 are arranged in a stepwise configuration by being uniformly reduced by two in the first direction (e.g., the y direction). For example, the number of second driving circuits PC2 may be changed, for example, the number of second driving circuits PC2 may be reduced by two and then reduced by four in the first direction (e.g., the y direction).

FIG. 5 illustrates that the second driving circuits PC2 are arranged in a stepwise configuration while being reduced by one, then by two, and then by four in the second direction (e.g., the x direction), but embodiments according to the present disclosure are not limited thereto. For example, the second driving circuits PC2 may be arranged in a stepwise configuration by being reduced by a certain number in the second direction (e.g., the x direction).

Figure 6:
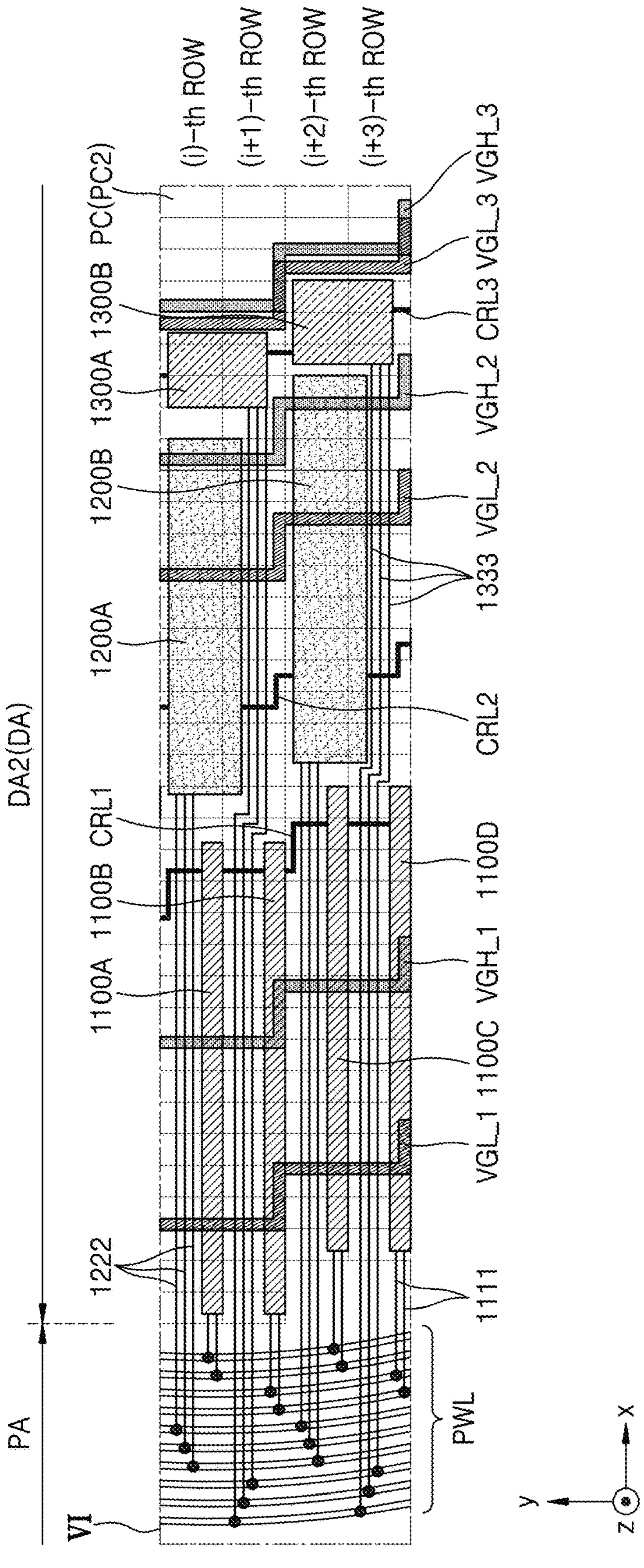
FIG. 6 is a schematic enlarged plan view of a region VI of the display apparatus of FIG. 5, according to some embodiments.

FIG. 6 is a schematic enlarged plan view of a region VI of the display apparatus of FIG. 5, according to some embodiments.

Referring to FIG. 6, the driving circuit PC and a gate driving circuit may be arranged in the display area DA to overlap each other. In this regard, FIG. 6 illustrates a first gate driving circuit, a second gate driving circuit, and a third gate driving circuit, which are arranged in the second display area DA2. FIG. 6 illustrates first stages 1100A, 1100B, 1100C, and 1100D arranged in the second display area DA2 as a portion of the first gate driving circuit, second stages 1200A and 1200B arranged in the second display area DA2 as a portion of the second gate driving circuit, and third stages 1300A and 1300B arranged in the second display area DA2 as a portion of the third gate driving circuit.

According to some embodiments, the first gate signals GW (refer to FIG. 2) may be respectively provided to driving circuits corresponding to the first stages 1100A, 1100B, 1100C, and 1100D. The second gate signals GI (refer to FIG. 2) or the third gate signals GC (refer to FIG. 2) may be respectively provided to driving circuits corresponding to the second stages 1200A and 1200B. The fourth gate signals EM (refer to FIG. 2) may be respectively provided to driving circuits corresponding to the third stages 1300A and 1300B.

The first stages 1100A, 1100B, 1100C, and 1100D may be arranged to correspond to a row of driving circuits PC, and may be arranged in a stepwise configuration along a rounded edge of a substrate or the rounded corner of the display area DA. For example, two first stages 1100A and 1100B may be arranged on the same line in the first direction (e.g., a y direction), and the other two first stages 1100C and 1100D may be arranged on the same line in the first direction (e.g., the y direction) but may be shifted and arranged in a second direction (e.g., an x direction) from the two first stages 1100A and 1100B stated above. FIG. 6 illustrates that two first stages form one group, and each group is arranged in a stepwise configuration, but embodiments according to the present disclosure are not limited thereto. In another embodiments, three or more first stages may form one group, and each group may be arranged in a stepwise configuration.

The second stages 1200A and 1200B may be arranged to correspond to the columns of two driving circuits PC, and may be arranged in a stepwise configuration along a rounded edge 100RE (or rounded corner) of a substrate and/or the rounded corner of the display area DA. The second stages 1200A and 1200B are arranged in the first direction (e.g., the y direction), but one second stage 1200B may be shifted and arranged in the second direction (e.g., the x direction) from the other one second stage 1200A.

The third stages 1300A and 1300B may be arranged to correspond to the columns of two driving circuits PC, and may be arranged in a stepwise configuration along the rounded edge 100RE (or rounded corner) of a substrate and/or the rounded corner of the display area DA. The third stages 1300A and 1300B are arranged in the first direction (e.g., the y direction) but one third stage 1300B may be shifted and arranged in the second direction (e.g., the x direction) from the other one third stage 1300A.

The first stages 1100A, 1100B, 1100C, and 1100D may provide a gate signal to a transistor of corresponding ones of the driving circuits PC arranged in the first and second display areas DA1 and DA2 (see FIG. 5). Each of the first stages 1100A, 1100B, 1100C, and 1100D may be positioned to correspond to any one row of the driving circuits PC and may be electrically connected to a first gate line of each row of the driving circuits PC. According to some embodiments, the first gate line may extend in the second direction (e.g., the x direction). Any one first stage 1100A may be positioned to correspond to an (i)-th row of the driving circuits PC (i.e., the driving circuits PC arranged in an (i)-th row) and may be electrically connected to a first gate line connected to the (i)-th row of the driving circuits PC (where i is a natural number of 1 or more). The other one first stage 1100B may be positioned to correspond to an (i+1)-th row of the driving circuits PC (i.e., the driving circuits PC arranged in an (i+1)-th row) and may be electrically connected to a first gate line connected to the (i+1)-th row of the driving circuits PC. The other one first stage 1100C may be positioned to correspond to an (i+2)-th row of the driving circuits PC (i.e., the driving circuits PC arranged in an (i+2)-th row) and may be electrically connected to a first gate line connected to the (i+2)-th row of the driving circuits PC. The other one first stage 1100D may be positioned to correspond to an (i+3)-th row of the driving circuits PC and may be electrically connected to a first gate line connected to the (i+3)-th row of the driving circuits PC.

The second stages 1200A and 1200B may provide a gate signal to a transistor of corresponding ones of the driving circuits PC arranged in the first and second display areas DA1 and DA2 (see FIG. 5). Each of the second stages 1200A and 1200B may be positioned to correspond to rows of a plurality of driving circuits PC. A second stage 1200A may be positioned to correspond to the (i)-th row of the driving circuits PC and the (i+1)-th row of the driving circuits PC. The second stage 1200A may be electrically connected to a second gate line connected to the (i)-th row of the driving circuits PC, and may be electrically connected to a third gate line connected to an (i+n)-th row of the driving circuits PC (where n is a natural number of 1 or more). According to some embodiments, each of the second gate line and the third gate line may extend in the second direction (e.g., the x direction).

The third stages 1300A and 1300B may provide a gate signal to a transistor of corresponding ones of the driving circuits PC arranged in the first and second display areas DA1 and DA2 (see FIG. 5). Each of the third stages 1300A and 1300B may be positioned to correspond to rows of the plurality of driving circuits PC. A third stage 1300A may be positioned to correspond to the (i)-th row of the driving circuits PC and the (i+1)-th row of the driving circuits PC. The third stage 1300A may be electrically connected to a fourth gate line connected to the (i)-th row of the driving circuits PC, and may be electrically connected to a fourth gate line connected to the (i+1)-th row of the driving circuits PC. According to some embodiments, the fourth gate line may extend in the second direction (e.g., the x direction).

The length of each of the first stages 1100A, 1100B, 1100C, and 1100C in the first direction (e.g., the y direction) may be less than the length of each of the second stages 1200A and 1200B in the first direction (e.g., the y direction), and the length of each of the second stages 1200A and 1200B in the first direction (e.g., the y direction) may be less than the length of each of the third stages 1300A and 1300B in the first direction (e.g., the y direction).

The clock signal lines PWL arranged in the peripheral area PA may be electrically connected to a corresponding stage of the first to third gate driving circuits to provide electrical signals. In this regard, FIG. 6 illustrates that at least one of the clock signal lines PWL is respectively electrically connected to the first stages 1100A, 1100B, 1100C, or 1100D through first signal connection lines 1111. FIG. 6 illustrates that at least one another clock signal line PWL is electrically connected to the second stages 1200A and 1200B through second signal connection lines 1222, and at least one other clock signal line PWL is electrically connected to the third stages 1300A and 1300B through third signal connection lines 1333.

The second signal connection lines 1222 and/or the third signal connection lines 1333 may pass through the display area DA. The second signal connection lines 1222 may pass between two adjacent first stages in the display area DA, for example, the second display area DA2. The third signal connection lines 1333 may pass between two adjacent first stages and between two adjacent second stages in the display area DA, for example, the second display area DA2.

Referring to FIG. 6, a group of second signal connection lines 1222 electrically connected to the second stage 1200A may be arranged between the first stage 1100A corresponding to the (i)-th row and a first stage corresponding to a previous row, for example, an (i−1)-th row. A group of second signal connection lines 1222 electrically connected to the second stage 1200B may be arranged between the first stage 1100B corresponding to the (i+1)-th row and the first stage 1100C corresponding to the (i+2)-th row, which is a subsequent row.

A group of third signal connection lines 1333 electrically connected to the third stage 1300A may be arranged between the first stage 1100A corresponding to the (i)-th row and the first stage 1100B corresponding to the (i+1)-th row, which is a subsequent row, and may be arranged between two adjacent second stages 1200A and 1200B.

A group of third signal connection lines 1333 electrically connected to the third stage 1300B may be arranged between the first stage 1100C corresponding to the (i+2)-th row and the first stage 1100D corresponding to the (i+3)-th row, which is a subsequent row, and may be arranged between the adjacent second stages (e.g., the second stage 1200B and other second stages).

Voltage input lines may be arranged in the display area DA, unlike the clock signal lines PWL. In this regard, FIG. 6 illustrates that first and second voltage input lines VGH_1 and VGL_1 electrically connected to the first gate driving circuit, first and second voltage input lines VGH_2 and VGL_2 electrically connected to the second gate driving circuit, and first and second voltage input lines VGH_3 and VGL_3 electrically connected to the third gate driving circuit pass through the second display area DA2. The first voltage input lines VGH_1, VGH_2, and VGH_3 and the second voltage input lines VGL_1, VGL_2, and VGL_3 may be bent to have stepwise shapes in a plan view. In some embodiments, the first voltage input lines VGH_1, VGH_2, and VGH_3 and the second voltage input lines VGL_1, VGL_2, and VGL_3 may be bent to have stepwise shapes in a plan view along the stepwise configuration of the driving circuits PC. That is, the voltage input line (or voltage line) configured to apply a voltage to the plurality of stages may overlap the plurality of second driving circuits PC2 in the second display area DA2. The voltage line may overlap the plurality of stages in the second display area DA2. The voltage line may extend in a first direction (e.g., y direction) and may be bent in the plan view.

Carry signal lines electrically connected to two adjacent stages may be bent to have stepwise shapes in a plan view. For example, at least one of first carry signal lines CRL1 electrically connected to two adjacent stages among the first stages 1100A, 1100B, 1100C, and 1100D may be bent to have a stepwise shape in a plan view. According to some embodiments, as shown in FIG. 6, the first carry signal line CRL1 between the first stage 1100B of the (i+1)-th row and the first stage 1100C of the (i+2)-th row may be bent to have a stepwise shape in a plan view.

Similarly, a second carry signal line CLR2 electrically connected to adjacent second stages 1200A and 1200B may be bent to have a stepwise shape in a plan view. According to some embodiments, a third carry signal line CRL3 electrically connected to the third stages 1300A and 1300B may be bent to have a stepwise shape in a plan view.

Figure 7:
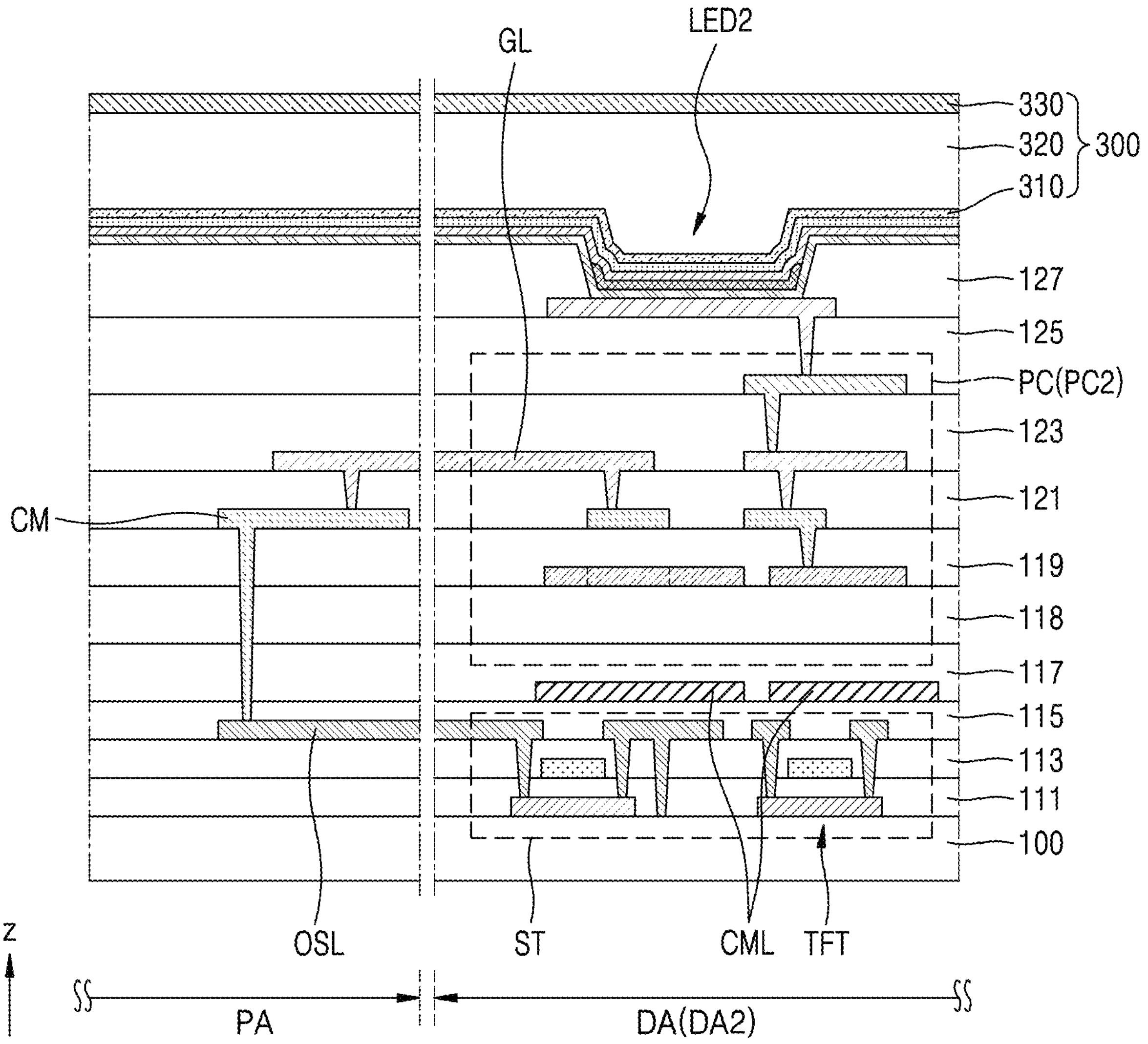
FIG. 7 is a cross-sectional view of a portion of a display apparatus according to some embodiments.

FIG. 7 is a cross-sectional view of a portion of a display apparatus 1 (see FIG. 1) according to some embodiments.

Referring to FIG. 7, a gate signal generated from each stage ST of a driving circuit in the second display area DA2 may be output through an output signal line OSL, and the output signal line OSL may be electrically connected to the gate line GL in the peripheral area PA.

In some embodiments, the output signal line OSL may be electrically connected to the gate line GL through a connection metal (or connection piece) CM in the peripheral area PA, and a gate signal generated from each stage ST may be provided to the driving circuits PC arranged in the same row as shown in FIG. 6 through an electrical connection structure of the output signal line OSL, the connection metal CM, and the gate line GL.

The stage ST of FIG. 7 may be one of the first stages 1100A, 1100B, 1100C, and 1100D, one of the second stages 1200A and 1200B, or one of the third stages 1300A and 1300B, which are described above with reference to FIG. 6.

For example, when the stage ST of FIG. 6 is the first stage 1100A arranged in the (i)-th row described above with reference to FIG. 6, a first gate signal output from the stage ST (or the first stage 1100A) may be transmitted to the driving circuits PC in the (i)-th row through the electrical connection structure of the output signal line OSL, the connection metal CM, and the gate line GL (e.g., a first gate line).

According to some embodiments, when the stage ST is the second stage 1200A described above with reference to FIG. 6, a gate signal output from the stage ST (e.g., the second stage 1200A) may be provided to the driving circuit PC in the (i)-th row as a second gate signal via an electrical connection structure of the output signal line OSL, the connection metal CM, and the gate line GL (e.g., a second gate line in the (i)-th row). The gate signal output from the stage ST (e.g., the second stage 1200A) may be provided to the driving circuit PC in the (i+n)-th row as a third gate signal via an electrical connection structure of the output signal line OSL, the connection metal CM, and the gate line GL (e.g., a third gate line in the (i+n)-th row).

For example, when the stage ST is the third stage 1300A described above with reference to FIG. 6, a gate signal output from the stage ST (e.g., the third stage 1300A) may be provided to the driving circuit PC in the (i)-th row as a fourth gate signal via an electrical connection structure of the output signal line OSL, the connection metal CM, and the gate line GL (e.g., a fourth gate line in the (i)-th row). The gate signal output from the stage ST (e.g., the third stage 1300A) may be provided to the driving circuit PC in the (i+1)-th row through an electrical connection structure of the output signal line OSL, the connection metal CM, and the gate line GL (e.g., a fourth gate line in the (i+1)-th row).

According to some embodiments, the area of a dead area outside a display area may be relatively reduced, and stages may be arranged while effectively using the space of the display area. However, these effects are examples, and the scope of embodiments according to the present disclosure is not limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A display apparatus comprising:
- a substrate comprising a display area including a rounded corner and a peripheral area outside the display area, wherein the display area comprises a first display area and a second display area between the first display area and the peripheral area;
- a plurality of first driving circuits in the first display area;
- a plurality of first light-emitting diodes electrically connected to the plurality of first driving circuits, respectively;
- a plurality of second driving circuits in the second display area;
- a plurality of second light-emitting diodes electrically connected to the plurality of second driving circuits, respectively;
- a plurality of gate lines electrically connected to the plurality of first driving circuits and the plurality of second driving circuits; and
- a plurality of stages in the second display area and electrically connected to the plurality of gate lines,
- wherein the plurality of stages is arranged in a stepwise configuration along the rounded corner of the display area in a plan view,
- wherein a voltage line configured to apply a voltage to the plurality of stages overlaps the plurality of stages in the second display area.

2. The display apparatus of claim 1, wherein the voltage line configured to apply a voltage to the plurality of stages overlaps the plurality of second driving circuits in the second display area.

3. The display apparatus of claim 2, wherein the voltage line is bent to have a stepwise shape in the plan view.

4. The display apparatus of claim 1, wherein each of the plurality of first driving circuits and the plurality of second driving circuits comprises:
- a driving transistor;
- a first transistor; and
- a second transistor, the first transistor and the second transistor being electrically connected to the driving transistor,
- wherein the plurality of stages comprises:
- a plurality of first stages each configured to provide a gate signal to the first transistor of corresponding ones of the plurality of first and second driving circuits; and
- a plurality of second stages each configured to provide a gate signal to the second transistor of corresponding ones of the plurality of first and second driving circuits.

5. The display apparatus of claim 4, wherein, in the plan view, one of two adjacent first stages among the plurality of first stages is arranged in a first direction with another of the two adjacent first stages and shifted from the other of the two adjacent first stages in a second direction intersecting the first direction, and,
- in the plan view, one of two adjacent two second stages among the plurality of second stages is arranged in the first direction with another of the two adjacent second stages and shifted from the other of the two adjacent second stages in the second direction.

6. The display apparatus of claim 5, wherein a length of each of the plurality of first stages in the first direction is different from a length of each of the plurality of second stages in the first direction.

7. The display apparatus of claim 5, further comprising a plurality of clock signal lines in the peripheral area,
- wherein a signal connection line connecting one of the plurality of clock signal lines to a corresponding one of the plurality of second stages is in the second display area and passes between the two adjacent first stages.

8. The display apparatus of claim 4, further comprising a carry signal line between two adjacent first stages among the plurality of first stages or between two adjacent second stages among the plurality of second stages is bent in the plan view.

9. The display apparatus of claim 1, wherein one of the plurality of stages provides a gate signal to a corresponding one of the plurality of gate lines via an output signal line,
- wherein the output signal line and the corresponding one of the plurality of gate lines are electrically connected to each other in the peripheral area.

10. A display apparatus comprising:
- a substrate comprising a display area including a rounded corner and a peripheral area outside the display area, wherein the display area comprises a first display area and a second display area between the first display area and the peripheral area;

a plurality of driving circuits in the first display area and the second display area;

a plurality of light-emitting diodes on the plurality of driving circuits and electrically connected to the plurality of driving circuits; and a plurality of first stages interposed between the substrate and the plurality of driving circuits, in a cross-sectional view, and configured to provide a first gate signal to the plurality of driving circuits, wherein the plurality of first stages are in the second display area and arranged in a stepwise configuration along the rounded corner of the display area in a plan view, wherein a voltage line configured to apply a voltage to the plurality of stages overlaps the plurality of stages in the second display area.

11. The display apparatus of claim 10, wherein the voltage line configured to apply a voltage to the plurality of first stages overlaps the plurality of driving circuits in the second display area.

12. The display apparatus of claim 11, wherein the voltage line extends in a first direction and is bent in the plan view.

13. The display apparatus of claim 10, further comprising a plurality of second stages in the second display area and configured to provide a second gate signal to the plurality of driving circuits, wherein the plurality of second stages are arranged in a stepwise configuration in the plan view.

14. The display apparatus of claim 13, wherein, in the plan view, the plurality of second stages are between the plurality of first stages and the first display area, and a length of each of the plurality of first stages in a first direction is different from a length of each of the plurality of second stages in the first direction.

15. The display apparatus of claim 14, wherein the length of each of the plurality of first stages in the first direction is less than the length of each of the plurality of second stages in the first direction.

16. The display apparatus of claim 13, further comprising a plurality of clock signal lines in the peripheral area, wherein a signal connection line connecting one of the plurality of clock signal lines to a corresponding one of the plurality of second stages is in the second display area and passes between two adjacent first stages among the plurality of first stages.

17. The display apparatus of claim 13, further comprising a carry signal line between two adjacent first stages among the plurality of first stages or between two adjacent second stages among the plurality of second stages is bent in the plan view.

18. The display apparatus of claim 10, further comprising a first gate line electrically connected to the plurality of driving circuits, wherein one of the plurality of first stages is configured to provide a first gate signal to the first gate line via an output signal line, and wherein the output signal line and the first gate line are electrically connected to each other in the peripheral area.

* * * * *